United States Patent [19]
Ho et al.

[11] Patent Number: 6,105,107
[45] Date of Patent: Aug. 15, 2000

[54] ATAPI STATE MACHINE CONTROLLED BY A MICROCONTROLLER FOR INTERFACING A DVD CONTROLLER WITH AN ATA HOST BUS

[75] Inventors: Son Hong Ho, Los Altos; Kevin Hung Tonthat, San Jose, both of Calif.

[73] Assignee: NeoMagic Corp., Santa Clara, Calif.

[21] Appl. No.: 09/126,118

[22] Filed: Jul. 30, 1998

[51] Int. Cl.[7] .................................................. G06F 12/00
[52] U.S. Cl. ........................... 711/112; 711/111; 711/113; 710/62; 709/217
[58] Field of Search ........................... 711/111, 113, 112; 710/62; 709/217

[56] References Cited

U.S. PATENT DOCUMENTS

| | | | |
|---|---|---|---|
| 5,661,848 | 8/1997 | Bonke et al. | 711/112 |
| 5,809,245 | 9/1998 | Zenda | 709/217 |
| 5,964,708 | 8/1999 | Fang et al. | 711/113 |
| 6,006,295 | 12/1999 | Jones et al. | 710/62 |

*Primary Examiner*—John W. Cabeca
*Assistant Examiner*—Christian P. Chace
*Attorney, Agent, or Firm*—Stuart T. Auvinen

[57] ABSTRACT

A digital-versatile disk (DVD) controller interfaces to an AT bus using ATAPI commands delivered in command packets. A microcontroller executes firmware routines to control the servo that positions the read head, and reads data sectors from the DVD disk. The microcontroller also performs error correction on the DVD data in a disk buffer. A host state machine is used to interface to the AT bus. State transitions in the host state machine are enabled or blocked by the microcontroller by setting auto-transition bits in a state-control register. The microcontroller can set auto bits to allow the host state machine to automatically receive multi-byte command packets, or to transfer data or send status to the host without microcontroller intervention. The microcontroller also has the option of performing any of these steps manually, such as for more complex ATAPI commands. Overlapping ATAPI commands are allowed when the AT bus is released. The host state machine can be programmed to wait for a service command from the host after the bus is released, and then automatically transfer data or status. Transfer errors send interrupts to the microcontroller so it can execute recovery routines.

20 Claims, 7 Drawing Sheets

| HOST ADDR (CS3,CS1,A2:0) | WRITE MODE | READ MODE |
|---|---|---|
| 10000 | DATA PORT | |
| 10001 | FEATURE | ERROR STATUS |
| 10010 | INTR REASON | |
| 10011 | SAM TAG BYTE | |
| 10100 | BYTE COUNT LOW | |
| 10101 | BYTE COUNT HIGH | |
| 10110 | DRIVE SELECT | |
| 10111 | COMMAND | STATUS |
| 11110 | DEVICE CTL | ALT STATUS |

PRIOR ART  FIG. 2

ATAPI STATE MACHINE CONTROLLED BY A MICROCONTROLLER FOR INTERFACING A DVD CONTROLLER WITH AN ATA HOST BUS

FIELD OF THE INVENTION

This invention relates to optical-disk systems, and more particularly to host-interfaces for DVD optical-disk controllers.

BACKGROUND OF THE INVENTION

Older CD-ROM optical disks are being replaced with high-capacity digital-versatile disk (DVD) optical disks for use on computer systems. DVD offers much higher data storage than CD-ROM. However, the higher data density ultimately requires that more data be sent from the DVD controller to a host such as a personal computer (PC's) host microprocessor or central processing unit.

Most PC's allow for expansion by plugging expansion or adapter cards into an expansion bus. The AT bus used in the original IBM-AT PC is still widely used for connecting peripheral devices such as modems and hard disk drives to the PC. The AT bus standard has been extended with the AT-Attachment with Packet Interface Extension (ATAPI) standard. ATAPI is often used for communicating with hard disks and other peripherals over the AT bus.

Peripheral devices often require device-specific control information such as a sector, track, or header ID to search for, or positioning information for a read head. This information could be transferred as individual writes to a register in the peripheral's AT adapter card, but the ATAPI specification is an improvement since this information is written as a single packet containing many bytes. The packet can be physically transferred using data-bursts rather than single write cycles. Bursts are more efficient of the host microprocessor and thus improve performance.

A communication session with a peripheral device using ATAPI proceeds through several phases. FIG. 1 shows phases in an ATAPI data transfer. The host microprocessor writes a command to a command register on the ATAPI peripheral during command phase 11. This may simply be a command to accept a packet of information about the actual operation being requested of the peripheral device. For such packet commands, packet phase 10 is entered where a multi-byte packet is written from the host to the peripheral device. The peripheral device then decodes this packet and executes the command indicated by the packet.

Frequently, the packet is a command for data transfer. Then data phase 12 is entered in which the data is transferred from the peripheral to the host. Standard 10 cycles or more efficient direct-memory access (DMA) cycles can be used for the data transfer. Typically a large block of data is transferred by specifying a starting address and a byte count. Once a transfer counter that was set to the byte count decrements to zero, the transfer is completed.

After the data transfer, status is reported to the host during status phase 14. An error could have occurred during the transfer, such as a data under-run where the peripheral was not able to fetch the data as quickly as the host received it. The wrong sector could have been read or data errors detected during the transfer. The host checks for these errors by reading a status register on the peripheral device.

The peripheral device generates an interrupt to the host microprocessor at various stages, such as when the data has been located and is ready for transfer. The host can also read the status register for busy, device ready, and data request status bits. Overlapped commands can be supported by the peripheral device going to release state 15 to release the AT bus for another command while the peripheral is getting itself set up. A service command is issued by the host to enter data phase 12 after a bus disconnect.

FIG. 2 shows task registers on an ATAPI peripheral device that are accessed by a host. Relatively few address locations are used by each peripheral device. The host indicates which register to access by setting an address using two chip-select signal CS3, CS1, and the three lowest address bits A2:0. When these bits are 10000, a data port is accessed for multi-byte transfers of data or a command packet. The data port can be connected to a first-in-first-out FIFO buffer that receives the packet or contains the data for transfer to the host.

An interrupt-reason register is accessed when the bits are 10010, while a tag byte is accessed for 10011. High and low 8-bit portions of a byte count of the transfer, and a drive select register are accessed using chip select/addresses 10100, 10101, and 10110. Other registers are different depending on whether the host is reading or writing. Address 10001 writes a feature register but reads an error status register. The command is written to address 10111 but a status is read from this address. Likewise, address 11110 writes device control but reads an alternate status register. All of these registers are 8-bits wide, except for the data port which is 16 bits wide.

Microcontroller on Peripheral Controls Transfers—FIG. 3

FIG. 3 shows an optical disk controller using a microcontroller for interfacing to a host using ATAPI. Optical disk 18 has a read head that is positioned by servo 32. Data is read from optical disk 18 into buffer 30, where error corrector 28 performs error correction on the data. Corrected data is transferred to FIFO 22 for reading by the host using AT bus 40.

The host writes command packets to FIFO 22 by first writing a packet-write command to task registers 24. Task registers 24 were shown in FIG. 2. Microcontroller 20 reads the packet-write command from task registers 24 and sets up FIFO 22 to receive the command packet from the host. Then microcontroller 20 decodes the command packet in FIFO 22 and executes the task. For data transfers, microcontroller must first position the read head by commanding servo 32 to move to the desired position, then operating with error corrector 28 to correct the data read from optical disk 18. The corrected data must be transferred by microcontroller 20 from buffer 30 to FIFO 22 each time FIFO 22 empties out. Microcontroller 20 notifies the host by sending interrupt 38 to the host and by setting bus status bits in bus signals 26. Microcontroller 20 must monitor FIFO 22 and refill it with data and also monitor handshaking with the host.

Such a microcontroller-based interface was effective for CD-ROM optical disks, since a relatively simple error correction was used and data rates were low. However, DVD optical disks use more complex error correction that requires more processing bandwidth from microcontroller 20. Higher data rates also increase the demands on microcontroller 20. Faster, more expensive microcontrollers may be required.

Microcontrollers are programmed using well-known techniques. The machine-level instructions, or firmware code, is stored in a ROM, and may be modified if the ROM is programmable, as is EPROM or EEPROM memory. A microcontroller is a self-contained computer and can perform a very wide range of tasks, and can be easily modified. However, microcontrollers are relatively expensive, since a high level of integration is needed to have a CPU, RAM, ROM, and I/O all on the same silicon die.

At higher speeds, synchronization is also a problem. The microcontroller typically operates with its own clock, which is asynchronous to the AT bus. Metastability can occur when the microcontroller reads or writes AT-bus signals. Metastable inputs and outputs can cause failures that are hard to reproduce or detect.

What is desired is a host interface for a DVD optical-disk controller. It is desired to reduce the loading of the microcontroller by the host interface, to free microcontroller bandwidth for DVD error correction. It is further desired to eliminate meta-stability problems from the AT bus interface. A host interface for the higher data requirements of DVD is desired.

SUMMARY OF THE INVENTION

A host interface for a digital-versatile disk (DVD) controller has a bus input for a bus coupled to a host. Task registers are coupled to the bus input. They are read and written by the host. The task registers include a command register that receives a single-byte command from the host and a status register for reading by the host. A FIFO buffer is coupled to the bus input. It stores a multi-byte command packet from the host and data from a DVD optical disk for transfer to the host.

A host state machine is coupled to the task registers. It receives the multi-byte command packet from the host into the FIFO buffer in response to a packet-input command. The packet-input command is a single-byte command written by the host to the command register. The host state machine also transfers data from the FIFO buffer to the host and sends status to the host through the status register. The host state machine generates microcontroller interrupts and host interrupts.

A state-control is coupled to the host state machine. It enables or blocks the host state machine from receiving the multi-byte command packet and enables or blocks transferring of data from the FIFO buffer and enables or blocks sending status to the host.

A microcontroller interface is coupled to a microcontroller. The microcontroller executes firmware routines to control the host state machine. The firmware routines are responsive to the microcontroller interrupts from the host state machine. The firmware routines set or clear bits in the state-control to enable or block the host state machine from:

(a) receiving the multi-byte command packet, (b) transferring data from the FIFO buffer; and (c) sending status to the host.

Thus the microcontroller controls the host state machine that interfaces with the host.

In further aspects of the invention a command decoder is coupled to the command register. It decodes the single-byte command from the host and signals the host state machine to receive the multi-byte command packet when the state-control has enabled the host state machine to receive the multi-byte command packet. It generates the microcontroller interrupt when the state-control has not enabled the host state machine to receive the multi-byte command packet. Thus the multi-byte command packet is automatically received without microcontroller intervention when enabled, but the microcontroller interrupt is generated when not enabled.

In still further aspects a transfer state machine is controlled by the host state machine. It transfers error-corrected bytes from an error-correction buffer to the FIFO buffer, and from the FIFO buffer to the host. A packet state machine is controlled by the host state machine. It receives bytes of the multi-byte command packet from the bus input into the FIFO buffer. Transfer of bytes into the FIFO buffer is controlled by low-level state machines.

In other aspects the host state machine has a host-active state for waiting for a single-byte command from the host and for waiting for intervention by the microcontroller. A receive-packet state is coupled to the host-active state. It receives the multi-byte command packet from the host when enabled by the microcontroller. A transfer state is coupled to the host-active state. It transfers data from the FIFO buffer to the bus input when enabled by the microcontroller. A status state is coupled to the host-active state and is coupled to the transfer state. It sends status from the status register to the host when enabled by the microcontroller. The status is read by the host immediately after data transfer when the microcontroller enables sending status to the host before data transfer is completed.

In still further aspects the host state machine also has a release state that is coupled to the host-active state and is coupled to the receive-packet state and is coupled to the transfer state. It releases the bus input when the host issues overlapped bus commands. A service wait state is coupled to the release state. It waits for a service command from the host before entering the transfer state or the status state when enabled by the microcontroller or the host-active state when not enabled. Thus the bus input is released and re-connected.

In other aspects the state-control has an auto-packet-receive bit that is coupled to the receive-packet state. It enables the host state machine to immediately enter the receive-packet state in response to the packet-input command without waiting for the microcontroller. An auto-transfer bit is coupled to the transfer state. It enables the host state machine to immediately enter the transfer state in response to the host without waiting for the microcontroller. An auto-status bit is coupled to the status state. It enables the host state machine to immediately enter the status state from the transfer state in response to an end of data transfer without waiting for the microcontroller. Thus the microcontroller enables the host state machine to enter states without waiting for the microcontroller.

BRIEF DESCRIPTION OF THE DRAWINGS

FIG. 2 shows task registers on an ATAPI peripheral device that are accessed by a host.

DETAILED DESCRIPTION

The present invention relates to an improvement in DVD host interfaces. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that the microcontroller used with a DVD controller needs to be off-loaded to free bandwidth for the more intensive DVD error correction. Using the microcontroller for interfacing to the AT bus also introduced metastability unless the microcontroller is synchronized to the AT-bus clock. Synchronizing to the AT-bus clock is undesirable since it can limit error correction and disk-buffering efficiency. While a hardware-based state machine could be used for interfacing with the host AT bus, the extensions of the ATAPI standard are complex. An ATAPI state machine implemented in hardware could require too many logic gates to support all the possibilities.

The inventors have further realized that only some of the ATAPI operations are critical to performance. These critical operations are implemented in hardware state machines by the inventors. Other ATAPI operations are implemented by the microcontroller. Thus a combination of hardware state machines and the microcontroller are used for the host interface.

Rather than use a free-running state machine, the state machine is controlled by the microcontroller. The microcontroller sets up the state machine to perform one or more tasks with the AT bus, but upon completion the state machine must wait for the microcontroller. The microcontroller controls which transitions in the state machine are allowed and which are blocked. This way the microcontroller can monitor and control the operation of the state machine. The microcontroller readies the state machine to automatically respond to future events.

Metastability is avoided because the hardware state machine generates AT bus signals under the control of the microcontroller. The microcontroller uses a clock that is asynchronous to the state machine.

Figure 1:
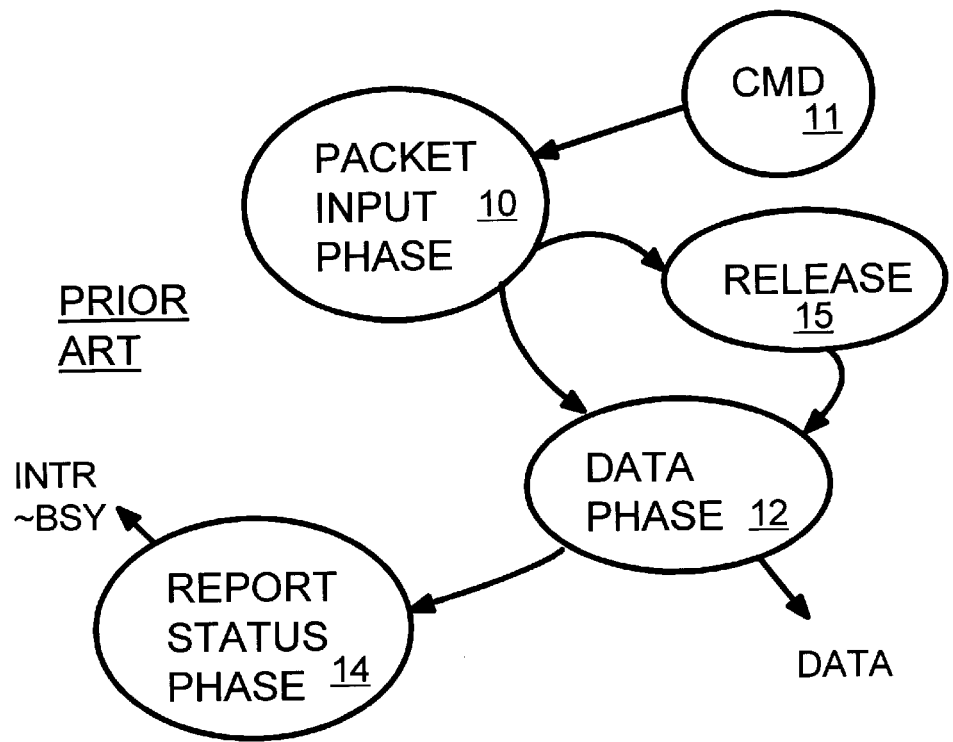
FIG. 1 shows phases in an ATAPI data transfer.
Figure 3:
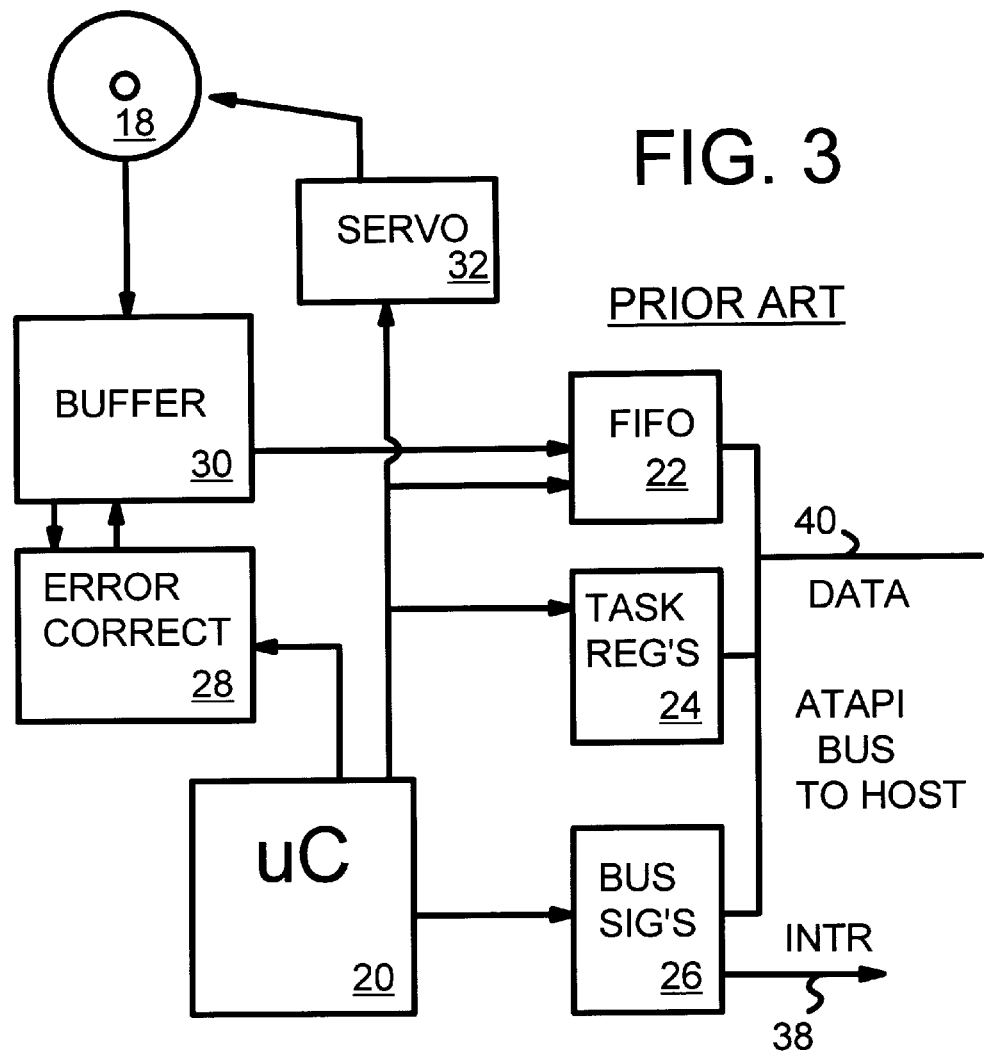
FIG. 3 shows an optical disk controller using a microcontroller for interfacing to a host using ATAPI.
Figure 4:
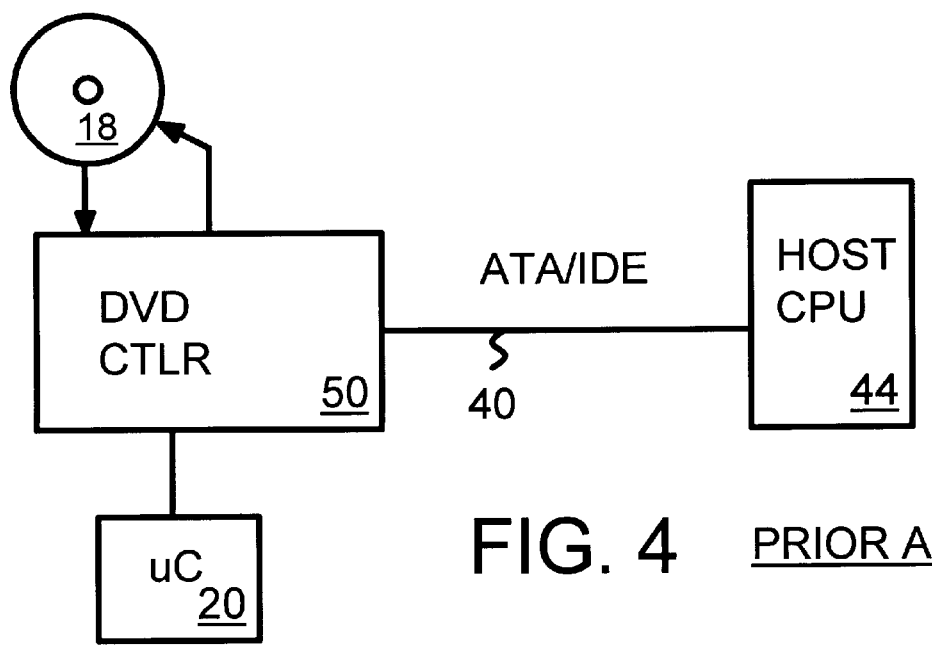
FIG. 4 shows a system for reading a DVD optical disk using an integrated DVD controller and a microcontroller.

FIG. 4 shows a system for reading a DVD optical disk using an integrated DVD controller and a microcontroller. DVD optical disk 18 is read by DVD controller 50, which contains a buffer memory. Microcontroller 20 executes firmware routines that perform error correction, servo control, and host buffering. Corrected data is sent over AT bus 40 to host CPU 44. AT bus 40 uses the ATAPI or the integrated-device-electronics (IDE) standards for communicating packets.

Figure 5:
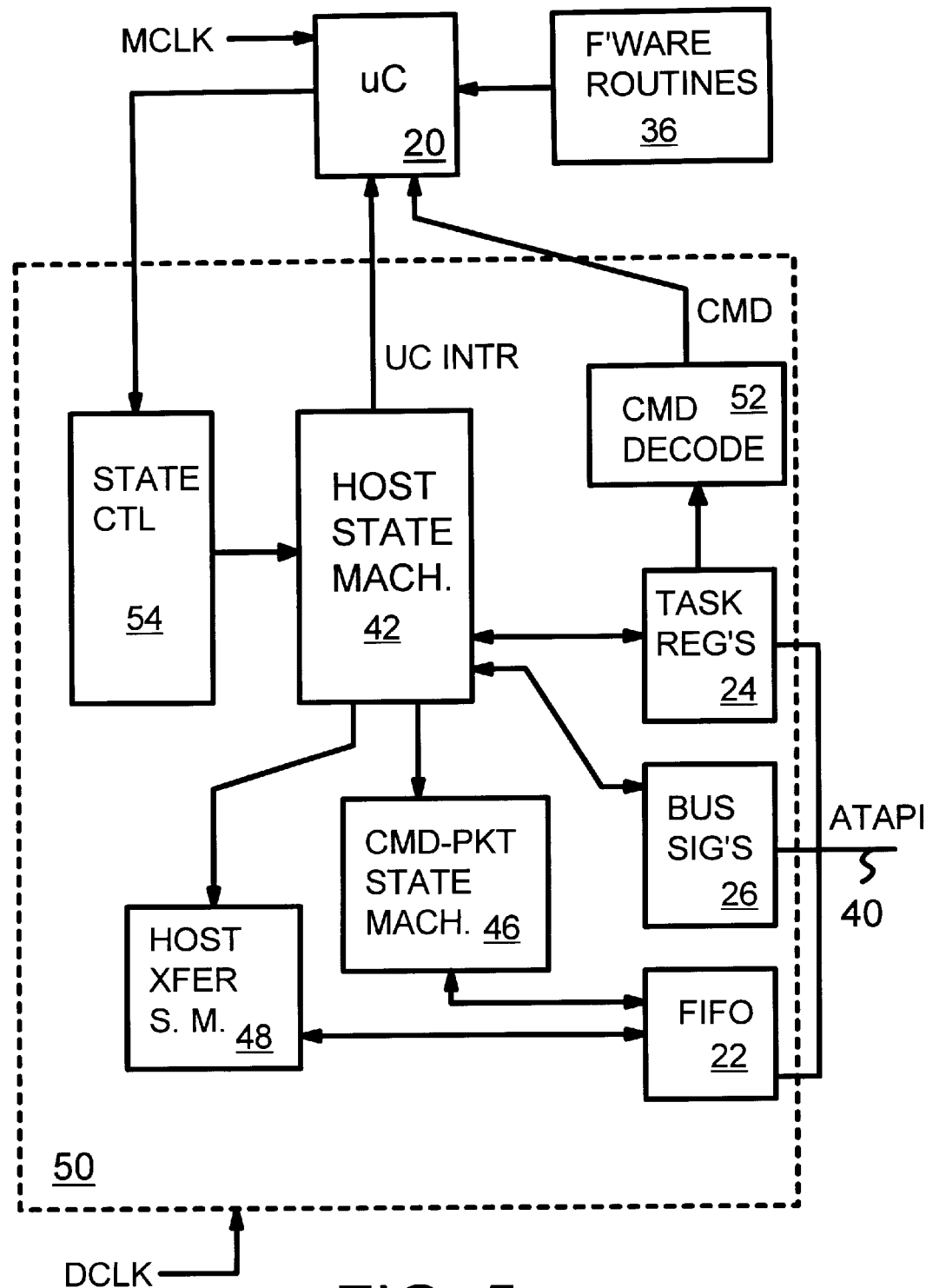
FIG. 5 is a diagram of an ATAPI host-interface for a DVD controller using microcontroller-controlled state machines.

Microcontroller-Controlled State Machines—FIG. 5

FIG. 5 is a diagram of an ATAPI host-interface for a DVD controller using microcontroller-controlled state machines. There are two different types of commands: normal commands and packet commands. For normal commands, the host microprocessor writes a one-byte command to command task register 24 over AT bus 40. DVD controller 50 sends a command-received interrupt to microcontroller 20.

Firmware routine 36 reads the command byte from command task register 24 over the bus between microcontroller 20 and DVD controller 50, and decodes the command. A routine is chosen for microcontroller 20 to execute the command. Some typical normal commands include ATAPI Soft Reset and Check Power Mode.

For the packet-input command, microcontroller 20 writes to state control 54 to allow host state machine 42 to receive the multi-byte packet. Host state machine 42 communicates with the host over AT bus 40 using bus signals 26. Host state machine 42 also activates packet state machine 46 to receive multiple bytes of the packet from AT bus 40 into FIFO 22. Once all bytes are received, packet state machine 46 informs host state machine 42 that all bytes of the packet have been received into FIFO 22. Host state machine 42 then generates an interrupt to microcontroller 20.

Microcontroller 20 responds to the interrupt from host state machine 42 by reading the multi-byte packet from FIFO 22 and setting up DVD controller 50 for any data transfer requested. This may involve sending commands to the servo controller to locate the desired sector, reading the data to the buffer (not shown), and performing error correction. Once the data is ready for transfer, microcontroller 20 writes to state control 54 to allow host state machine 42 to perform the data transfer.

Host state machine 42 performs the data transfer by activating transfer state machine 48, which reads the corrected data from the buffer and writes it to FIFO 22. Transfer state machine 48 writes more corrected data to FIFO 22 as FIFO 22 is emptied out by the host reading the data, or by a DMA transfer over AT bus 40. Once all requested data has been transferred, transfer state machine 48 signals to host state machine 42 that the terminal byte count has been reached. Host state machine 42 then changes bus signals 26 and sends an interrupt to microcontroller 20 before halting. Microcontroller 20 checks the status of the optical disk and the transfer and writes status information to a status register in task registers 24.

Microcontroller 20 is clocked with a microcontroller clock MCLK, which is not synchronous to DVD clock DCLK used to operate DVD controller 50.

Figure 6:
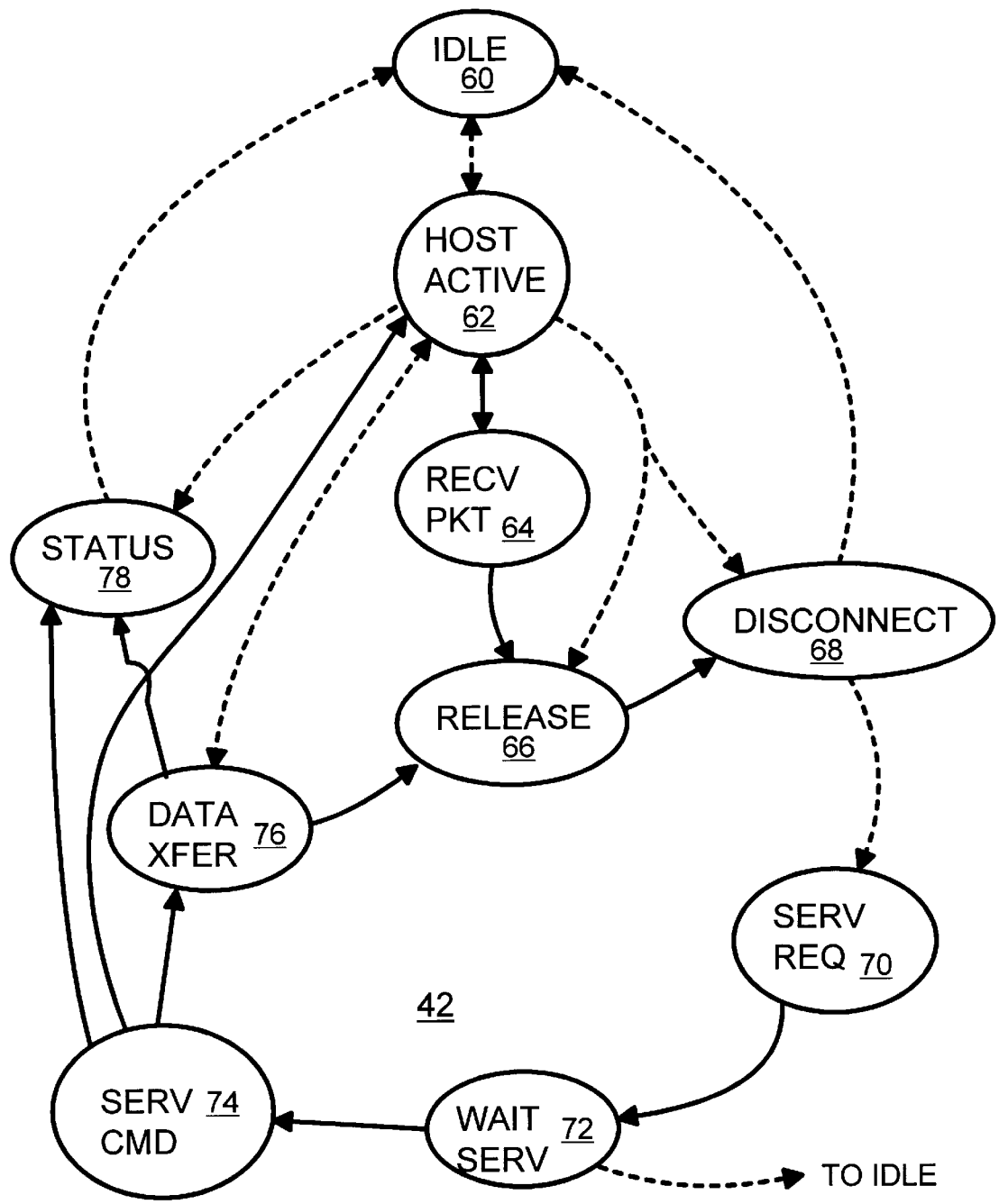
FIG. 6 is a state diagram of the host state machine that is controlled by the microcontroller.

Host State Machine—FIG. 6

FIG. 6 is a state diagram of the host state machine that is controlled by the microcontroller. Some of the state transitions of host state machine 42 can only occur with intervention of the microcontroller. Other state transitions occur without microcontroller intervention.

Idle state 60 is active before a command from the host is detected. The busy bit of the status register is cleared in this state. When the host writes the one-byte command to the command task register, host active state 62 is entered and busy is set.

The microcontroller can manually transition host state machine 42 to other states, depending on the command. These manual, microcontroller-initiated transitions are indicated by dashed transition lines in FIG. 6. For example, in response to a data transfer command, the microcontroller can transition from host active state 62 to data transfer state 76 by setting an auto-data-transfer bit. When a status-request command is made, the microcontroller can force host state machine 42 into status state 78 by setting an auto-status bit, so that the status can be read by the host. Release state 66 and disconnect state 68 can also be manually entered from host active state 62 by setting an auto-release bit. "Manually" refers to the microcontroller's firmware routines writing to the state control to alter the state of host state machine 42; user intervention is not required since the state is changed by program control of the firmware.

Host state machine 42 can automatically receive the multi-byte packet when the microcontroller sets an auto-packet-receive bit in the state-control register. When the initial single-byte command from the host is a packet command, the microcontroller enables host state machine 42 to transition from host active state 62 to receive-packet state 64 as the host starts sending the command packet. The packet state machine is activated to receive the command packet into the FIFO. The packet state machine clears busy and sets data request DRQ and the interrupt to inform the host that it can send the command packet. Once the command packet is received, host state machine 42 returns to host active state 62, waiting for the microcontroller to decode the command packet and set up the DVD controller to process the command. The packet state machine sends a packet-received interrupt to the microcontroller, which saves the task registers and the command packet.

Host transfer state 76 is entered from host active state 62 once the microcontroller has decoded the command packet and set up the DVD controller for the transfer by searching for the target sector on the DVD disk, and reading and correcting the data. Host-transfer state 76 remains active until all bytes have been transferred to the host. The transfer state machine is activated during host-transfer state 76 to transfer data bytes from the error-correction buffer to the FIFO. The byte count is decremented as each byte is read to the host.

Upon completion of the data transfer, host active state 62 is re-entered when no other state-control bits are set. This allows the microcontroller to closely monitor the command's progress. The microcontroller can also set the auto-release bit in the state-control register, causing release state 66 to be entered once the last byte is transferred. This causes the AT bus to be released as soon as possible.

The host can check the status immediately after the data transfer completes when the microcontroller sets the auto-status bit in the state-control register. Status state 78 is then entered directly from data-transfer state 76. Otherwise status state 78 is entered from host active state 62 when the microcontroller decodes a status request from the host. In status state 78 the busy bit is cleared and the interrupt is set to the host. The host responds to the interrupt by reading the status. Idle state 60 in entered once the host reads the status.

Non-overlapped commands sequence from host active state 62 to receive-packet state 62, back to host active state 62, then to data-transfer state 76 and to status state 78, either directly or through host active state 62.

The microcontroller can also set an auto-release bit in the state-control register, causing host state machine 42 to automatically transition from receive-packet state 64 to release state 66. Release state 66 is used for overlapping commands, where the host sends commands to another peripheral while the DVD controller is setting up for the data transfer.

Release state 66 is also entered manually by the microcontroller setting the auto-release bit while in host active state 62, or automatically (without microcontroller intervention) when the auto-release bit has been set, from data-transfer state 76. The AT bus is released by release state 66, which leads to disconnect state 68.

The microcontroller sets an auto-service bit in the state-control register to transition host state machine 42 from disconnect state 68 to service-request state 70. An interrupt is sent to the host from service-request state 70 to inform the host that the DVD controller is ready to transfer the requested data. The microcontroller waits until the data has been read from the DVD disk and corrected before setting the auto-service bit.

Wait-for-service state 72 is next entered after the interrupt is generated, while the DVD controller waits for the host to send the service request for data transfer or status. When the service command is received, service-command state 74 is entered. The service bit in the status register is cleared, and the busy bit is set.

From service-command state 74, host active state 62 is entered when none of the auto-state bits have been set. When the microcontroller decoded a data-transfer command and then set the auto-transfer bit, data-transfer state 76 is entered automatically. When the microcontroller decoded a status-request command and then set the auto-status bit, status state 78 is entered automatically from service-command state 74.

Service states 70, 72, 74 are only used for overlapping AT-bus commands, where the host disconnects from the DVD controller to perform other tasks while the DVD controller is busy searching for the data or otherwise responding to the command for a long period of time.

An error occurs when a new command is received while a current command is being processed. A command abort state (not shown) is entered from states 64, 68, 72, or 76. Busy is set in the abort state until the microcontroller has recovered and is ready for a new command. The microcontroller then sets the host-active bit to send host state machine 42 to host active state 62. The microcontroller can also force host state machine 42 into idle state 60 from states 62, 68, 72, and 78 by setting a goto-bus-free bit in the state-control register.

The microcontroller can perform some tasks manually. For example, the microcontroller can receive the command packet manually from host active state 62 by waiting until a command-packet is detected. It then reads the FIFO for the command packet and decodes the packet. Receive-packet state 64 is not entered.

Some state can only be exited by direct microcontroller intervention, such as setting an auto bit in the state-control register. Host active state 62, disconnect state 68, and status state 78 are only exited under control of the microcontroller. Other state transitions occur automatically by host state machine 42 in response to host activity and AT-bus signals. Thus the state machine quickly responds to the host, but is ultimately controlled by the microcontroller firmware.

Figure 7:
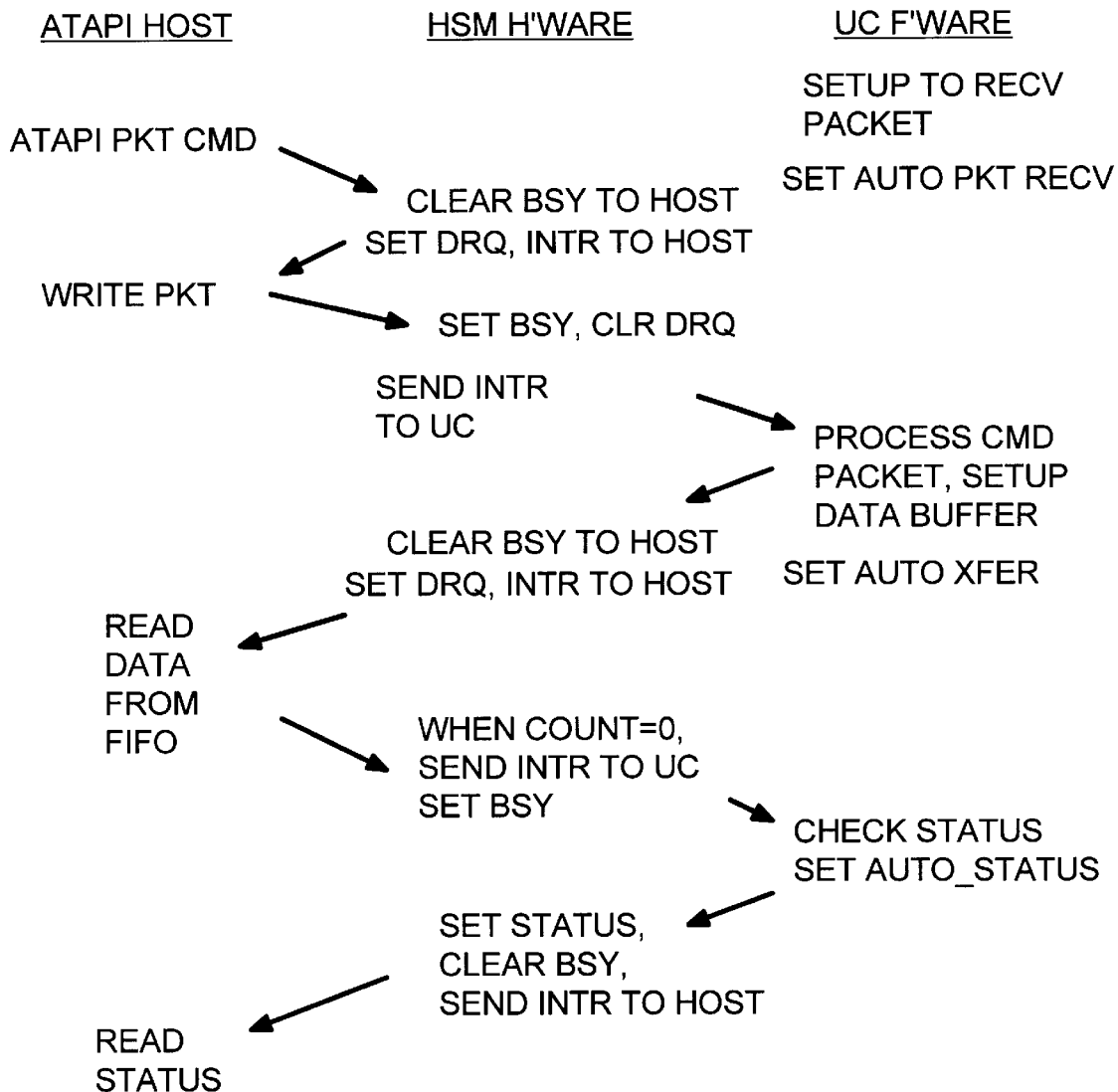
FIG. 7 highlights handshaking among the host, state machine, and microcontroller.

Microcontroller & State-Machine Handshaking—FIG. 7

FIG. 7 highlights handshaking among the host, state machine, and microcontroller. The microcontroller firmware first sets up the host state machine to receive a command and sets the auto-packet-receive bit in the state-control register. The busy bit in the status task register is cleared.

The host writes the command over the AT bus to the command task register. Once the host state machine detects the writing of the command register, it sets the code/data CD bit and clears the input-output IO bit in the status register to confirm that the host is outputting code (a command). The busy bit is cleared and the data-request DRQ bit is set in the status register to indicate that the DVD controller can receive the packet. An interrupt is generated to the host to request the host to continue.

The host then writes the command packet to the FIFO using the data port in the task-register address space. Busy is set and DRQ is cleared by the host state machine once the entire 12-byte command packet is received in 6 writes from the host. A packet-received interrupt is sent to the microcontroller from the host state machine once the packet is received. The host state machine returns to the host-active state and waits for the microcontroller.

The microcontroller reads and evaluates the command packet from the FIFO. For data transfer requests, the data sector is read and error-corrected and buffer pointers are set up. After some delay, when the data is ready, the microcontroller sets the auto-transfer bit in the state-control register, causing the host state machine to enter the data-transfer state and being the data transfer.

In the data-transfer state, the host state machine clears busy, sets data request DRQ, and generates an interrupt to the host. The code or data (CoD) status bit is cleared and the IO bit set to confirm a data input to the host. The host can read the status task register to check the busy and DRQ bits to see that the DVD controller is ready to transfer the data.

The host reads the bytes in the block, either using CPU-IO cycles or preferably DMA cycles. Since the data port is 16 bits, many cycles may be required to transfer a whole block. The byte count was initialized by the microcontroller with the block size during the setup. This byte count is decremented for each byte transferred until zero is reached, indicating that the transfer is complete. A transfer-done interrupt is then sent to the microcontroller and the busy status bit set.

The microcontroller checks for transfer or disk errors and sets the error status bits accordingly. Then the auto-status bit is set, sending the host state machine to the status state. The host active state was entered from the data-transfer state upon completion of the data transfer since the auto-status bit was not set.

In the status state, the host state machine sets CoD and IO in the status register to confirm that the host is inputting non-data (code). Busy is cleared and the interrupt to the host generated. The host responds by reading the status task register.

Figure 8:
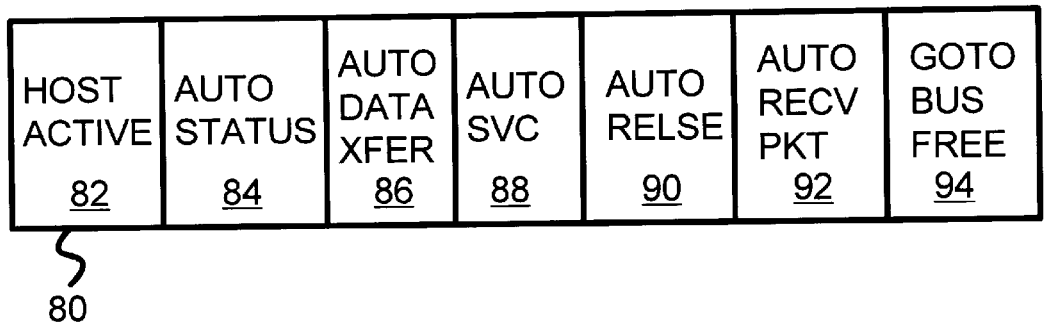
FIG. 8 shows the state-control register used by the microcontroller to control the host state machine.

State-Control Register—FIG. 8

FIG. 8 shows the state-control register used by the microcontroller to control the host state machine. State-control register 80 operates with state control 54 of FIG. 5 to control some of the transitions in host state machine 42. The auto-control bits may first be synchronized to the state machine's clock by an extra register stage.

Normally only one or two of the auto bits in register 80 are set at any time. The auto bits 82, 84, 86, 88, 90, 92, 94 in state-control register 80 are automatically cleared by the host state machine as the particular states are entered or exited. Thus each auto bit enables the state just once. The microcontroller must set the auto bits each time the state machine is used.

Host-active bit 82 is set to force the host state machine to the host-active state. When the state machine is already in the host-active state, the host-active bit is cleared upon leaving the host-active state. The host-active bit may be set with another of the auto bits to force the state machine to first return to the host-active state before transitioning to another state.

Auto-status bit 84 causes the host state machine to enter the status state from the host-active state. When the host state machine is not in the host-active state, and auto-transfer bit 86 is set, the host state machine first performs the transfer in the data-transfer state, and then enters the status state directly from the data-transfer state. Auto-status bit 84 causes the host state machine to enter the status state from the host-active state. When the host state machine is not in the host-active state, and auto-service bit 86 is set, the host state machine first performs the transfer by sequencing through the service states 70, 72, 74 before transferring data in the data-transfer state. It then enters the status state directly from the data-transfer state. Thus the microcontroller can program a series of phases by setting the auto-status and auto-transfer bits at the same time.

Auto-transfer bit 86 is set to enable the data-transfer state. The data transfer state is entered immediately from the host-active state when auto-service bit 88 is not set. When auto-service bit 88 is also set, the service states are entered first, states 70, 72, 74 to allow the host AT bus to disconnect for an overlapping command to another peripheral.

When a data-transfer error occurs, the status state is not entered even when auto-status bit 84 is set. Instead, the host-active state is entered to allow the microcontroller to diagnose the error condition and set the error status bits.

Auto-service bit 88 is set to enable overlapped commands from the host. Service request state 70 is entered from disconnect state 68 when auto-service bit 88 is set. When the host state machine is in the host-active state, the disconnect state is entered first to disconnect the bus. The host state machine waits for the service command from the host in the wait-service state, and the begins the data transfer when auto-transfer bit 86 is set, or a status read when auto-status bit 84 is set. When neither bits 84, 86 are set, the host-active state is returned to upon receipt of the service command to allow the microcontroller to directly control the command response.

Auto-release bit 90 is set to enable a bus release for overlapping host commands. A release can occur by entering the release state from the data-transfer state, the receive-packet state, or the host-active state. Bus release can occur automatically after a data transfer, before the status is read, by setting auto-release bit 90 and auto-transfer bit 86. Bus release after a command packet is received occurs when auto-release bit 90 and auto-packet-receive bit 92 are both set.

Auto-packet-receive bit 92 is set to allow a command packet to be received automatically from the host-active state. When the host write the single-byte command "A0" to the command task register, the hardware decodes this command as the packet-receive command and immediately enters the receive-packet state, allowing the host to burst in the command-packet bytes. There is no delay waiting for the microcontroller to respond.

Goto-bus-free bit 94 is set to force the host state machine back to the idle state. When the microcontroller is manually controlling the host interface, this bit is used after the status state to return to idle. Abnormal conditions such as errors can also use this bit to return to idle.

Figure 9:
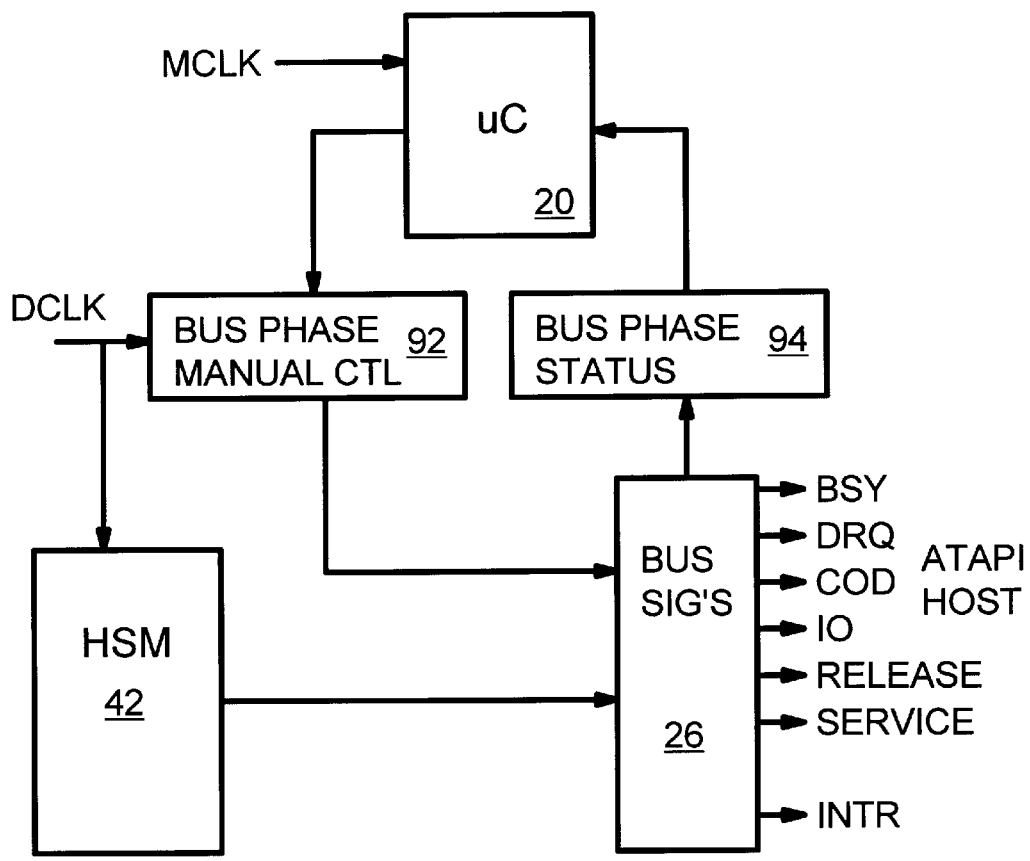
FIG. 9 shows how the microcontroller can directly read or write the bus status bits that are normally controlled by the host state machine.

Bus Control—FIG. 9

FIG. 9 shows how the microcontroller can directly read or write the bus status bits that are normally controlled by the host state machine. The bus signals BSY, DRQ, CoD, IO, RELEASE, and SERVICE in the status task register, and the interrupt signal to the host are controlled by bus signals 26. Normally host state machine 42 sets and clears these bus signals as states are entered or exited. These bits can be read by microcontroller 20 by reading bus-phase status register 94, which has a copy of the bits from bus signals 26.

In an unusual case, microcontroller 20 may directly write bus signals 26. Microcontroller 20 writes to bus-phase manual control register 92, which synchronizes the bus signals to the DVD clock DCLK before updating bus signals 26.

Microcontroller 20 uses its own microcontroller clock MCLK which is not necessarily synchronous to DCLK.

Figure 10:
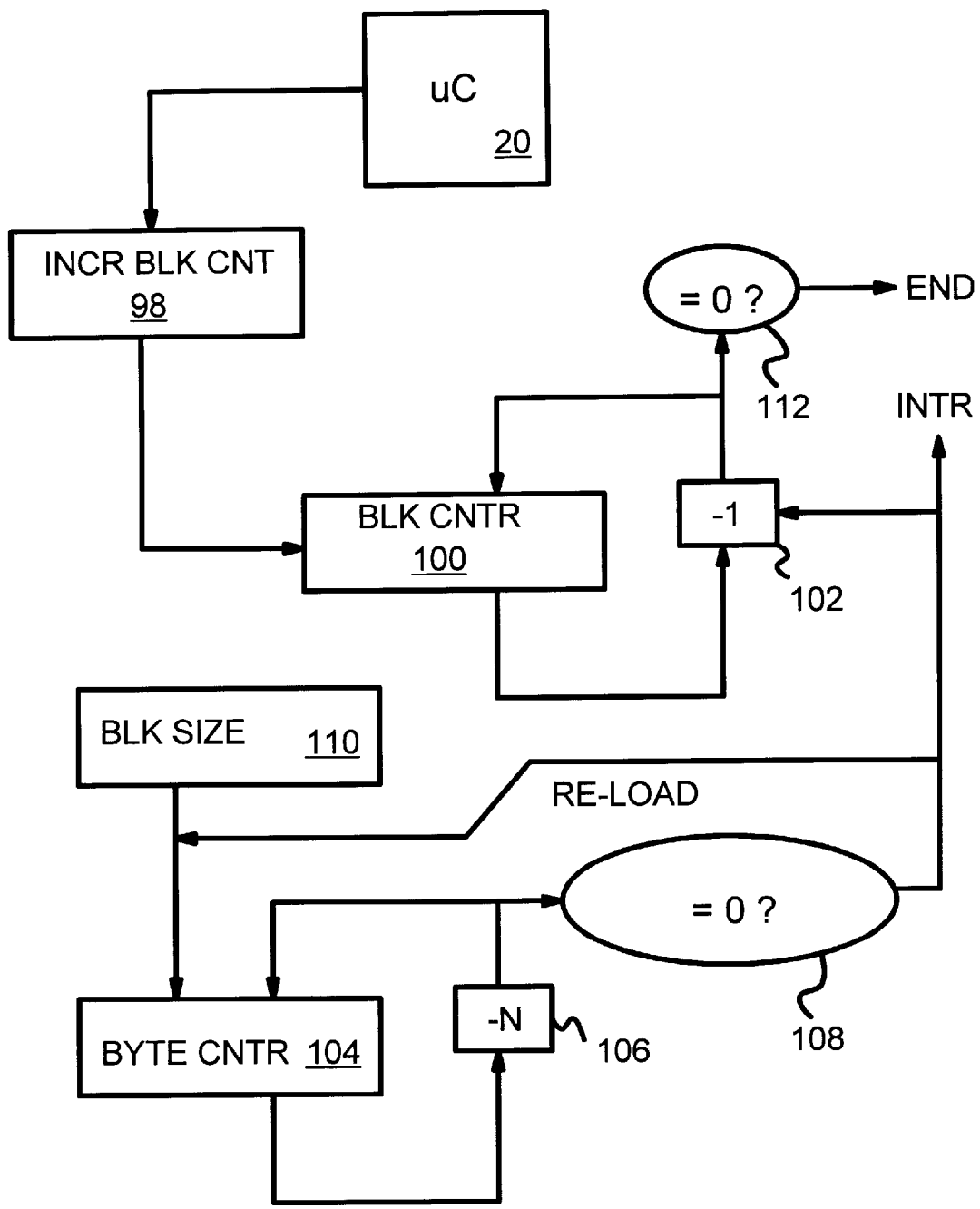
FIG. 10 shows a byte and block counter for data transfer.

Block and Byte Counter—FIG. 10

FIG. 10 shows a byte and block counter for data transfer. For data transfers less than a block in size, byte counter 104 is loaded by microcontroller 20 with the number of bytes during setup for the command. Once the data-transfer phase begins, byte counter 104 is decremented by two bytes by decrementer 106 for each 16-bit read by the host. Once the byte count reaches zero, comparator 108 generates an interrupt to the host. Block counter 100 was set to one when less than a block is transferred, so comparator 112 signals that transfer is complete.

When multiple blocks are transferred, microcontroller 20 programs the number of blocks into block counter 100. The block size is programmed into block-size register 110. Different block sizes can be used depending on the host; the block size does not have to be the same as the error-correction code ECC block size used by DVD disks.

The block size from register 110 is initially copied to byte counter 104. As bytes in the first block are transferred, decrementer 106 reduces the byte count until comparator 108 detects that the byte count has reached zero. Then the block size from block-size register 110 is re-loaded into byte counter 104 for the next block.

When comparator 108 signals the end of a block, decrementer 102 decrements the block count from block counter 100 by one. Once all block have been transferred, comparator 112 detects that the block count has reached zero, and the end of transfer is signaled. The microcontroller can be interrupted, or when the auto-status or auto-release bits are set, the status or release states can be entered immediately by the host state machine. This allows the host to read the status or regain the bus without waiting for the microcontroller.

The host may request more block than are immediately available, perhaps because some of the blocks have not yet been read from the DVD disk or error-corrected. The start of data transfer does not have to be delayed. Instead, the number of blocks currently available are programmed by microcontroller 20 into block counter 100. As time passes and the transfer is in progress, more blocks may become available. Then microcontroller 20 increases the block count in block counter 100. Rather than directly write to block counter 100, microcontroller 20 writes the number of additional blocks now available into increment-block register 98. During the middle of a block when there is no danger of comparator 108 signaling the end of a block, the block count from block counter 100 is added to the increment value in increment-block register 98 and the increased block count stored back to block counter 100. Metastability hazards are thus avoided.

ADVANTAGES OF THE INVENTION

Rather than use a free-running state machine, the state machine is controlled by the microcontroller. The microcontroller sets up the state machine to perform one or more tasks with the AT bus, but upon completion the state machine waits for the microcontroller. The microcontroller controls which transitions in the state machine are allowed and which are blocked. This way the microcontroller can monitor and control the operation of the state machine, but the actual communication with the host is performed by the more responsive state machine.

The auto-packet-receive feature allows command packets to be quickly received from the host. The host can use a burst mode to transfer the packet bytes, further increasing performance. When the auto-release bit is set the host bus can be quickly released. Status can be read by the host immediately after transfer by setting the auto-status bit. A data transfer can occur immediately when the host sends a service command by setting the auto-service and auto-transfer bits. The microcontroller also has the option of manually performing steps such as receiving packets or performing more obscure ATAPI commands.

Metastability is avoided because the hardware state machine generates status bits for the AT bus and task registers under the control of the microcontroller. The microcontroller uses a clock that is asynchronous to the state machine. Response time to the host is speeded up, not only for packet commands, but also for data transfer and status commands.

ALTERNATE EMBODIMENTS

Several other embodiments are contemplated by the inventors. For example many logic implementations are possible. The firmware routines can be stored in a separate memory from the microcontroller, or within a ROM in the microcontroller chip itself. The microcontroller can perform by itself some tasks or be assisted by hardware. Error correction can use hardware to generate syndromes for checking errors but use the microcontroller for more complex calculations such as locating errors and determining the correction. The host is typically connected to the AT bus through one or more buffer chips.

Low-to-high transitions of the internal clock are used in one embodiment for all state machine transitions, and the state machine is implemented with D-type flip-flops. The states may fully decoded, with one state per flip-flop, or encoded, with the states encoded into fewer flip-flops with encoders and decoders. Thus many states could be encoded in fewer flip-flops with this scheme. The actual logic implementation of the state machines can be left to logic-synthesis software tools as is commonly done.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A host interface for a digital-versatile disk (DVD) controller comprising:

a bus input for a bus coupled to a host;

task registers, coupled to the bus input, for being read and written by the host, the task registers including a command register receiving a single-byte command from the host and a status register for reading by the host;

a FIFO buffer, coupled to the bus input, for storing a multi-byte command packet from the host and for storing data from a DVD optical disk for transfer to the host;

a host state machine, coupled to the task registers, for receiving the multi-byte command packet from the host into the FIFO buffer in response to a packet-input command, the packet-input command being a single-byte command written by the host to the command register, the host state machine also for transferring data from the FIFO buffer to the host, and for sending status to the host through the status register, the host state machine generating microcontroller interrupts and host interrupts;

state-control means, coupled to the host state machine, for enabling or blocking the host state machine from receiving the multi-byte command packet and for enabling or blocking transferring data from the FIFO buffer and for enabling or blocking sending status to the host;

a microcontroller interface, coupled to a microcontroller, the microcontroller for executing firmware routines to control the host state machine, the firmware routines responsive to the microcontroller interrupts from the host state machine, the firmware routines setting or clearing bits in the state-control means to enable or block the host state machine from:

(a) receiving the multi-byte command packet, (b) transferring data from the FIFO buffer; and (c) sending status to the host, whereby the microcontroller controls the host state machine that interfaces with the host.

2. The host interface of claim 1 further comprising:

a command decoder, coupled to the command register, for decoding the single-byte command from the host and signaling the host state machine to receive the multi-byte command packet when the state-control means has enabled the host state machine to receive the multi-byte command packet, but for generating the microcontroller interrupt when the state-control means has not enabled the host state machine to receive the multi-byte command packet, whereby the multi-byte command packet is automatically received without microcontroller intervention when enabled, but the microcontroller interrupt is generated when not enabled.

3. The host interface of claim 1 further comprising:

a transfer state machine, controlled by the host state machine, for transferring error-corrected bytes from an error-correction buffer to the FIFO buffer, and from the FIFO buffer to the host;

a packet state machine, controlled by the host state machine, for receiving bytes of the multi-byte command packet from the bus input into the FIFO buffer, wherein transfer of bytes into the FIFO buffer is controlled by low-level state machines.

4. The host interface of claim 1 wherein the host state machine further comprises:

host-active state means for waiting for a single-byte command from the host and for waiting for intervention by the microcontroller;

receive-packet state means, coupled to the host-active state means, for receiving the multi-byte command packet from the host when enabled by the microcontroller;

transfer state means, coupled to the host-active state means, for transferring data from the FIFO buffer to the bus input when enabled by the microcontroller;

status state means, coupled to the host-active state means and coupled to the transfer state means, for sending status from the status register to the host when enabled by the microcontroller;

wherein the status is read by the host immediately after data transfer when the microcontroller enables sending status to the host before data transfer is completed.

5. The host interface of claim 4 wherein the host state machine further comprises:

release state means, coupled to the host-active state means and coupled to the receive-packet state means and coupled to the transfer state means, for releasing the bus input when the host issues overlapped bus commands;

service wait state means, coupled to the release state means, for waiting for a service command from the host before entering the transfer state means or the status state means when enabled by the microcontroller or the host-active state means when not enabled, whereby the bus input is released and re-connected.

6. The host interface of claim 5 wherein the state-control means comprises:

an auto-packet-receive bit, coupled to the receive-packet state means, for enabling the host state machine to immediately enter the receive-packet state means in response to the packet-input command without waiting for the microcontroller;

an auto-transfer bit, coupled to the transfer state means, for enabling the host state machine to immediately enter the transfer state means in response to the host without waiting for the microcontroller;

an auto-status bit, coupled to the status state means, for enabling the host state machine to immediately enter the status state means from the transfer state means in response to an end of data transfer without waiting for the microcontroller, whereby the microcontroller enables the host state machine to enter states without waiting for the microcontroller.

7. The host interface of claim 6 wherein the state-control means further comprises:

an auto-release bit, coupled to the release state means, for enabling the host state machine to immediately enter the release state means from the transfer state means in response to an end of data transfer without waiting for the microcontroller, whereby the microcontroller enables the host state machine to release the bus input without waiting for the microcontroller.

8. The host interface of claim 7 wherein the status register includes a busy bit, a data-request bit, an input direction bit, and a code or data bit all set or cleared by the host state machine as states are entered.

9. The host interface of claim 7 wherein the host interrupt is generated by the host state machine when the single-byte command is received, when the FIFO buffer has received the multi-byte command packet, and before and after data is transferred from the FIFO buffer to the host.

10. A method for transferring corrected data from an optical disk to a host, the method comprising:

setting an auto-packet receive bit in a state-control register on a controller chip;

waiting for a command written to a command task register in the controller chip by the host;

decoding the command to determine when the command is a packet-input command and sending an interrupt to a microcontroller when the command is not the packet-input command;

when the command is the packet-input command:

clearing a busy status bit in a status task register on the controller chip and setting a data-request bit in the status task register and sending an interrupt to the host from a host state machine in the controller chip;

receiving a multi-byte command packet from the host and setting the busy status bit and clearing the data-request bit and sending an interrupt from the host state machine to the microcontroller when the multi-byte command packet is received;

the microcontroller decoding the multi-byte command packet and setting up the controller chip to read a sector specified by the multi-byte command packet;

setting an auto-transfer bit in the state-control register when the multi-byte command packet is for a data transfer;

the host state machine clearing the busy status bit, setting the data-request bit, and generating an interrupt to the host when the auto-transfer bit is set;

transferring multiple bytes of corrected data read from the optical disk to the host until all bytes have been transferred;

the host state machine sending an interrupt to the microcontroller when all bytes have been transferred and a auto-status bit has not been set in the state-control register; and when the microcontroller has set an auto-status bit in the state-control register, the host state machine clearing the busy status bit and sending the interrupt to the host to instruct the host to read a transfer-status register;

whereby the microcontroller enables the host state machine to receive the multi-byte command packet, transfer data, or send status by setting bits in the state-control register.

11. The method of claim 10 further comprising:

the microcontroller programming a byte count register with a number of bytes in a block;

the microcontroller programming a block count register with a number of blocks to be transferred to the host;

decrementing a byte count register as each of the multiple bytes of corrected data is transferred to the host;

when the byte count register reaches zero, decrementing the block count register and reloading the byte count register with the number of bytes in the block;

when the block count register reaches zero, sending the interrupt to the microcontroller that all bytes have been transferred.

12. The method of claim 11 further comprising:

as additional blocks of data are read from the optical disk and corrected, writing an increment value to an increment register, the increment value indicating a number of additional corrected blocks available for transfer to the host;

when the block count register is not being decremented, adding the increment value to the block count register, whereby additional blocks are transferred.

13. A digital-versatile disk (DVD) subsystem comprising:

a microcontroller for executing routines to control data transfer from a DVD optical disk to a host;

a DVD controller, coupled to the microcontroller and coupled to read the DVD optical disk, for receiving data read from the DVD optical disk and for correcting errors in the data and for transferring corrected data to the host;

a bus interface, on the DVD controller, for sending the corrected data over a host bus to the host;

task registers, coupled to the bus interface, for receiving a command from the host and for sending status to the host;

a host state machine, coupled to the bus interface, for generating busy, data-request, input/output IO, and code/data CD status bits for the task registers in response to bus phases of communication with the host and for generating a host interrupt to the host;

a FIFO buffer, coupled to the bus interface, for receiving multi-byte command packets from the host, the multi-byte command packets read and decoded by the microcontroller to determine a location on the DVD optical disk to read data;

a state-control register, coupled to control the host state machine and written by the microcontroller, for enabling the host state machine to immediately enter bus phases of communication with the host without microcontroller intervention, whereby the microcontroller enables the host state machine to immediately respond to the host.

14. The DVD subsystem of claim 13 wherein the state-control register includes reset means for clearing an enable bit after the host state machine enters a state enabled by the enable bit, whereby enable bits are cleared after use.

15. The DVD subsystem of claim 13 wherein the host state machine further comprises:

an idle state active when no host commands have been received;

a host-active state, coupled to the idle state, active when a command is received from the host or when the microcontroller has not enabled the host state machine to enter bus phases communication with the host without microcontroller intervention;

a receive-packet state, coupled to the host-active state, for receiving the multi-byte command packet from the host and generating the host interrupt when the multi-byte command packet is received;

a transfer state, coupled to the host-active state, for transferring corrected data to the host by decrementing a byte count until all bytes have been transferred, and for generating a microcontroller interrupt to the microcontroller when all bytes have been transferred;

a status state, coupled to the host-active state, for sending a transfer status to the host by generating the host interrupt when the status is ready for reading.

16. The DVD subsystem of claim 15 wherein the host state machine further comprises:

a release state, coupled to the host-active state and the transfer state, for releasing the host bus after transfer is completed or the multi-byte command packet is received;

a disconnect state, coupled to the release state, for disconnecting from the host bus;

a service waiting state, coupled to the disconnect state, for waiting for a service command from the host;

a service state, coupled to the service waiting state, for entering the transfer state or the status state when enabled by the microcontroller, or for entering the host-active state when not enabled by the microcontroller to wait for the microcontroller to process a host request, whereby the host bus is released and reconnected.

17. The DVD subsystem of claim 16 wherein the state-control register comprises:

an auto-packet-receive bit, coupled to the receive-packet state, for enabling the host state machine to immediately enter the receive-packet state in response to a packet-input command without waiting for the microcontroller;

an auto-transfer bit, coupled to the transfer state, for enabling the host state machine to immediately enter the transfer state in response to the host without waiting for the microcontroller;

an auto-status bit, coupled to the status state, for enabling the host state machine to immediately enter the status state from the transfer state in response to an end of data transfer without waiting for the microcontroller, whereby the microcontroller enables the host state machine to enter states without waiting for the microcontroller.

18. The DVD subsystem of claim 17 wherein the state-control register further comprises:

an auto-release bit, coupled to the release state , for enabling the host state machine to immediately enter the release state from the transfer state in response to an end of data transfer without waiting for the microcontroller, whereby the microcontroller enables the host state machine to release the bus interface without waiting for the microcontroller.

19. The DVD subsystem of claim 13 wherein the FIFO buffer is further for storing corrected data from the DVD optical disk for transfer to the host, whereby the FIFO buffer is used both for receiving multi-byte command packets from the host and for sending corrected data from the DVD optical disk to the host.

20. The DVD subsystem of claim 13 wherein the microcontroller is controlled by a microcontroller clock, and wherein the host state machine is controlled by a second clock, the second clock asynchronous to the microcontroller clock.

* * * * *